Oct. 27, 1959 W. M. WITTENBERG 2,910,674

MAGNETIC CORE MEMORY

Filed April 19, 1956 2 Sheets-Sheet 1

INVENTOR.
WILFORD M. WITTENBERG
BY Ralph L. Thomas
ATTORNEY

Oct. 27, 1959 W. M. WITTENBERG 2,910,674

MAGNETIC CORE MEMORY

Filed April 19, 1956 2 Sheets-Sheet 2

INVENTOR.
WILFORD M. WITTENBERG
BY Ralph L. Thomas
ATTORNEY 2,910,674

MAGNETIC CORE MEMORY

Wilford M. Wittenberg, Poughkeepsie, N.Y., assignor to International Business Machines Corporation, New York, N.Y., a corporation of New York Application April 19, 1956, Serial No. 579,392

5 Claims. (Cl. 340—174)

This invention relates to a storage device and more particularly to storage devices employing magnetic elements.

The incorporation of high speed digital computing devices into extensive data processing systems has created a demand for data storage devices having random access and a speed of operation compatible with the high rate of data processing. Slow acting electrical relays, sufficient as storage devices in earlier processing systems, were subsequently replaced by vacuum tube and gas tube circuits as the need arose for faster memory devices in systems capable of greater rates of data processing. Next the advent of cathode ray tube storage systems provided addressable memory devices with still greater speeds of access to a relatively large quantity of stored information. The developments in ferrite cores in more recent times, however, have led to memory devices having much greater speeds of access to stored information, thereby providing digital data processing systems with the capacity to handle far greater quantities of data in a given unit of time.

As the size of magnetic memory systems increases and the number of storage registers becomes larger, the function of addressing a given register becomes progressively more difficult as a practical matter. The added requirement in coincident current magnetic memory devices of bidirectional currents for read and write purposes lends further complexity to the addressing function. As illustrated, for example, in copending application Serial Number 471,002 filed November 22, 1954 by H. D. Ross et al. for Electronic Data Processing Machine, both an X coordinate selection system and a Y coordinate selection system must be employed in order to provide random access to the various storage registers during a memory cycle, the current flow during the read period being opposite to the current flow during the write period. By means of the apparatus of the present invention a relatively faster memory device having a comparatively simple address selection arrangement is provided wherein reading and writing may be performed with a minimum of terminal or external control equipment.

According to the principles of the present invention a novel memory device employing two magnetic cores per unit or bit of information is capable of extremely high speeds of operation and is adaptable to memory systems having random access to a large quantity of stored information. One of the two cores per bit may serve as a memory core while the other may serve as a switch core that automatically writes in the memory core any binary information desired, either new or old information. Since the time required to switch a magnetic core is proportional to the applied magnetomotive force, the speed at which the two cores per bit may be switched can be made extremely high. For example, read and write operations may be accomplished with large magnetomotive forces which, in a very short interval of time, drive the cores far into the saturation region in either of the two bistable states. The rapid switching operations, however, develop heat within a core which, if the switching rate is sufficiently high, may cause a temperature rise in excess of the decalescence or Curie point, beyond which the magnetic property of the core is lost. While an upper limit on operating speed of the magnetic cores is determined by the temperature at which the magnetic property is lost, various techniques such as refrigeration, lamination, and use of materials having a higher Curie point may be employed to secure practical operation in the range of one microsecond.

With a simplified arrangement of components and circuits the memory system of the present invention utilizes a read signal to effect read operations, and the read signal in conjunction with information signals, either new or those read, automatically controls the writing of information in the selected register. To the extent that the address selection and control equipment may be reduced by virtue of a simplified arrangement, various economies in manufacture and repair can be realized as well as providing reliability, efficiency and speed of operation.

Accordingly, it is an object of the present invention to provide a high speed memory device.

Another object of the present invention is to provide a high speed memory device which employs two magnetic cores per bit or unit of information in a novel arrangement for reading and writing with a minimum of control equipment.

A further object of the present invention is to provide a high speed memory device which uses one magnetic core for storage and an associated switch core for automatically writing back new or old information in the storage core wherein the read signal aids in controlling the switch core for writing purposes.

A further object of the present invention is to provide a high speed memory device which uses one magnetic core for storage and an associated switch core for automatically writing back new or old information in the storage core wherein the read signal and information signals control writing.

A still further object of the present invention is to provide a magnetic memory device with a speed of operation limited primarily by the dacalescence or Curie point of the magnetic materials employed.

Other objects of the invention will be pointed out in the following description and claims and illustrated in the accompanying drawings, which disclose, by way of example, the principle of the invention and the best mode, which has been contemplated, of applying that principle.

Figure 1:
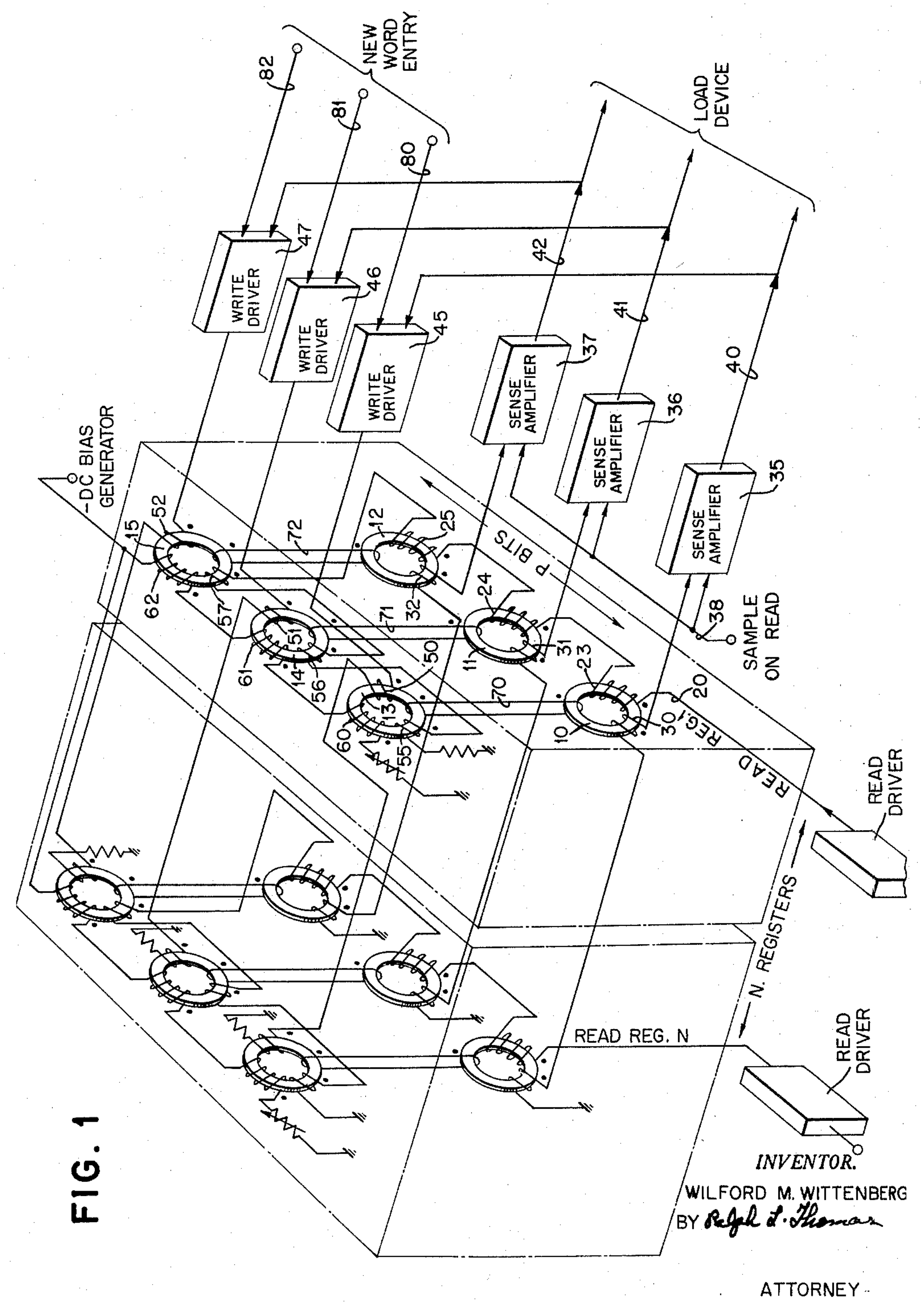
Fig. 1 is a schematic representation, partly in block form, of a magnetic memory device incorporating the principles of the present invention.

The illustrative embodiment of Fig. 1 shows the construction of a memory system capable of reading and writing information according to the principles of the present invention.

In order to obtain information stored in a selected storage register, terminal or external control equipment must supply a read signal to the given storage register. The read signal creates sufficient magnetomotive force on all memory cores of the selected storage register to reset them, causing read-out, and creates a magnetomotive force less than the coercive force on all switch cores of the selected register. All switch cores have a constantly applied magnetomotive force which tends to hold all switch cores in a given magnetic state, and the magnetomotive force of the read signal opposes the constantly applied magnetomotive force. Memory cores which undergo a change in state, indicating a predetermined binary condition, cause a sensing means associated with each digit or bit position to supply an information signal to the corresponding digit or bit position of a load device. An output signal from a sensing means may indicate binary one and the absence of a signal may indicate binary zero. The output of each sensing means is applied also to an associated writing means for that digit position which in turn causes a magnetomotive force less than the coercive force to be established on all switch cores corresponding to that digit position. Consequently, all switch cores have the constantly applied magnetomotive force; all switch cores of the selected storage register have another magnetomotive force established by the read signal which is approximately equal to but in opposition to the constantly applied magnetomotive force and various ones of these switch cores will have a further magnetomotive force established by the sensing means in aiding relation with the magnetomotive force of the read signal provided the associated memory core undergoes a change in state. When present on a switch core, the latter two magnetomotive forces provide a resultant magnetomotive force sufficient to overcome the opposition of the constantly applied magnetomotive force and to exceed the coercive force of the switch core, thereby reversing its magnetic state. Accordingly, if the memory cores in the various digit positions of the selected storage register undergo a change in state when a read signal is applied, the state of the associated switch core is reversed. As soon as the read signal and the output signal of the writing means terminate, the switch cores are reset to their initial state by the constantly applied magnetomotive force; whereupon a signal induced in a winding coupled between each switch core and its associated memory core returns the memory core to the magnetic state existing at the beginning of the memory cycle. Whenever new information is to be stored, the memory cycle is initiated and the sensing means is controlled to suppress the passing of output signals while new information signals simultaneously supplied to the writing means manipulate the switch cores to cause insertion of new information in the storage cores after the read signal terminates.

Whenever a storage core in the lower portion of Fig. 1 is interrogated by setting it to a predetermined state, the resulting output signal is detected by suitable sensing circuits which distinguish between a change in state or no change in state of the storage core. The two stable states of the cores may be designated arbitrarily as representing binary one and binary zero. Assuming a magnetomotive force is applied to the storage core which tends to set it in the zero state upon read-out, either of two possibilities may take place. First the storage core may not change state, indicating a binary zero was stored. Second, the storage core may undergo a change in state, indicating a binary one was stored. In the first case an output signal of a given amplitude results; whereas in the second case an output signal of a larger amplitude results. Suitable sensing circuits may be employed to distinguish between the two signals and provide an output signal to a load device in the second case only. Thus an output signal to the load device may indicate binary one, and no signal may indicate binary zero.

In order to effect automatic rewrite, an output signal to a load device may also be used to activate a suitable amplifier which, in combination with the read signal, drives the switch core to a given state. Once the read signal and the signal from the amplifier are terminated, the switch core is driven to the state opposite to the given state with a magnetomotive force constantly maintained by a winding connected to a bias source. As the switch core undergoes this change in state, an output winding coupling the switch core to the memory core drives the memory core back to the one state. In the case where a zero is read from the memory core upon read-out, no output signal is supplied to a load device, and the switch core continues undisturbed, leaving the memory core in the zero state after read-out. By means of the novel apparatus of the present invention, a quick read-out and rapid rewrite provides a very short memory cycle.

With reference to Fig. 1, the invention is illustrated in a system wherein only two storage registers of three digit positions each are shown. The register 1 of Fig. 1 includes three storage cores 10, 11 and 12 associated with respective switch cores 13, 14 and 15. Whenever it is desired to read information from register 1, a read signal is applied via conductor 20 to read windings 23, 24 and 25 on respective storage cores 10, 11 and 12. As the flux within any storage core changes, an output signal is developed in respective output windings 30, 31 and 32 associated with cores 10, 11 and 12. The output signal may be unipolar for both binary zero and binary one, the amplitude being greater for binary one which is arbitrarily selected as representing a change in state during read. The output signals from the output windings 30, 31 and 32 are applied to respective sense amplifiers 35, 36 and 37, described in greater detail subsequently, which distinguish between the amplitudes of unipolar signals representing binary one and binary zero and provide an output signal if, and only if, a binary one is detected and a Sample on Read signal is present on an input conductor 38. The conductor 38 is energized during read whenever information is to be supplied to the output conductors 40 through 42; otherwise information read from the storage cores is prevented from reaching the output conductors 40 through 42 in the absence of a Sample on Read signal. Signals representing binary one from the output of sense amplifiers 35, 36 and 37 are supplied via respective conductors 40, 41 and 42 to a load device, not shown, and to associated write drivers 45, 46 and 47, described in greater detail hereinafter. The write drivers in turn supply an output signal to corresponding windings 50, 51 and 52 on the respective switch cores 13, 14 and 15.

Read signals supplied to windings 23, 24 and 25 are also supplied to respective windings 55, 56 and 57 positioned on corresponding switch cores 13, 14 and 15. In operation the magnetomotive force developed on the storage cores 10, 11 and 12 by the read signal is greater than the coercive force, causing read-out of these cores, but the magnetomotive force developed on the switch cores 13, 14 and 15 by the read signal is less than the coercive force. The switch cores 13, 14 and 15 are normally biased to saturation in a given direction by a magnetomotive force established by current flowing through windings 60, 61 and 62 respectively. Since these windings are serially connected with a variable resistor and a power supply, the magnitude of the constant magnetomotive force on the switch cores 13, 14 and 15 may be adjusted to saturate these cores in the given direction. Whenever both windings 50 and 55 on the switch core 13 are energized, for example, they create magnetomotive forces in aiding relation and of sufficient magnitude to overcome the constant magnetomotive force developed by the winding 60 and saturate the switch core 13 in the opposite direction. In a like manner the windings 51, 56 on the switch core 14 and the windings 52, 57 on the switch core 15 serve to reverse the state of saturation of the associated switch core when both windings in each instance are energized. A signal is induced in each of resistive output windings 70, 71 and 72 associated with the respective switch cores 13 through 15 as a result of a read signal but the induced signal is inconsequential since the windings 70, 71 and 72 are wound on the storage cores 10 through 12 in such a manner that the resulting magnetomotive force is in the same direction as the magnetomotive force produced by the read signal. When the read signal terminates, the associated write driver likewise terminates its output; whereupon the associated switch core changes from saturation in the opposite direction to saturation in the given direction. Consequently, a signal is induced in an output winding 70, 71 or 72 of sufficient amplitude and in a direction to set the corresponding memory core in the one state if the corresponding memory core previously held a one in storage.

In order to illustrate further the manner in which the apparatus of the present invention operates, assume that the storage core 10 is in a magnetic state representing a binary one when a read signal is applied to the read winding 23. As the read signal drives the storage core 10 to the opposite magnetic state representative of binary zero, a signal is induced in the output winding 30 of sufficient amplitude to cause the sense amplifier 35 to supply an output signal via conductor 40 to a load device, not shown, and a write driver 45. The magnitude of the signal from the write driver 45 through the winding 50 of the switch core 13 and the magnitude of the read signal through the winding 55 is sufficient that the resultant magnetomotive force overcomes the constant magnetomotive froce developed by the winding 60 and drives the switch core 13 to saturation in the opposite direction. A signal induced in the winding 70 by the switch core 13 is uneventful as pointed out previously. As the read signal to the winding 55 and the output of the write driver 45 terminate, the constant magnetomotive force developed by winding 60 assumes control and drives the switch core 13 to saturation in the initial state; whereupon, an output signal induced in the winding 70 is sufficient in magnitude to drive the storage core 10 from the zero state to the one state. Thus it is seen that a one is read, supplied to a load device, and then rewritten automatically. Whenever a zero is read from the core 10, no output signal is supplied by the sense amplifier 35; consequently no signal is supplied to the load device and the write driver 45; the magnetomotive force developed by the read signal in the winding 55 is not sufficient to overcome the constant magnetomotive force developed by the winding 60; and the storage core 10 remains in the zero state. There is a signal induced in the winding 70 as the read signal in the winding 55 terminates which tends to set the core 10 to the one state, but the amplitude of this signal is not sufficient to reverse the state of the core 10.

The writing of information in the register comprising the storage cores 10, 11 and 12 when it is desired to change existing information is accomplished by first disabling the sense amplifiers during read and supplying appropriate signals to the write drivers which then write into the memory core via the switch core in the manner explained above with respect to automatic rewrite. The sense amplifiers 35 through 37 are disabled during a read period by the absence of a signal on the conductor 38, and signals representing the new information are supplied to input terminals 80 through 82 of respective write drivers 45 through 47. Assuming that the register 1 including core 10 is being read, for example, the absence of a Sample on Read signal on conductor 75 prevents the sense amplifier 35 from passing a signal if the core 10 held a one in storage, and a signal or no signal simultaneously applied to the terminal 80 of the write driver 45 causes a one or zero respectively to be written via the switch core 13 in the memory core 10. In a similar manner signals on the new word entry conductors 81 and 82 are stored in respective memory cores 11 and 12.

Thus there is shown and described a novel storage device which is capable of being selectively addressed for reading and writing at high speeds and which includes a simple yet unique arrangement of two cores per bit for performing automatic rewrite with read operations by means of a single address decoding device. The speed of operation may be limited by the decalescence or Curie temperature of the magnetic cores employed.

Although the illustrative embodiment shows a memory arrangement provided with two registers of three storage units each, it is to be understood that the number of registers and the number of storage units per register may be varied as desired and that such memory planes may be incorporated into a more elaborate system.

*Basic circuits*

Figure 2:
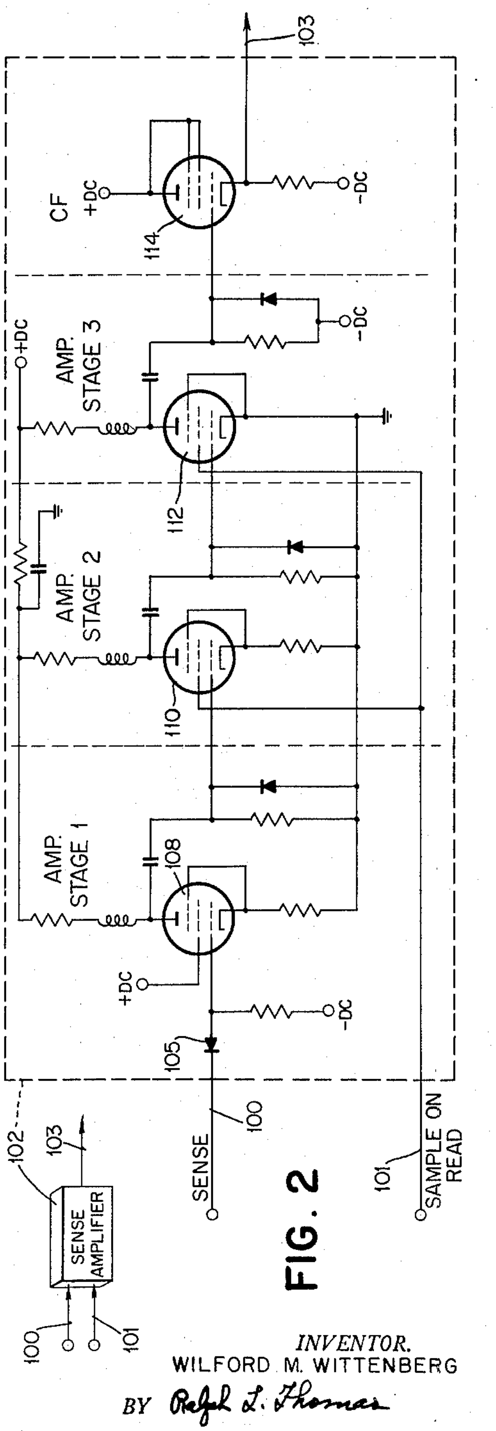
Fig. 2 is a wiring schematic of the sense amplifier circuit shown in block form in Fig. 1.

With reference to Fig. 2, the sense amplifier shown in block form in Fig. 1 is shown in detail as comprising three amplifier stages and a cathode follower arranged in cascade. Whenever negative signals of different amplitudes, the smaller representing binary zero and the larger representing binary one, are applied to an input conductor 100 and a positive Sample on Read signal is applied to an input conductor 101, the sense amplifier 102 functions to yield a positive output signal on conductor 103, if and only if, the input signal is the larger negative signal. Under all other possible conditions the sense amplifier 102 functions to yield a negative output signal on the conductor 103. Various circuits may be designed to perform this function, and the sense amplifier of Fig. 2 may be considered as one illustrative design for this purpose.

A Sample on Read pulse on the input conductor 101 unblanks or conditions the vacuum tubes in the amplifier stages 2 and 3 to pass detected signals from amplifier stage 1. If the input signal on conductor 100 from the sense windings of magnetic cores is a small negative signal indicative of binary zero, the diode 105 fails to conduct because the D.C. bias on its anode is sufficient to keep the anode negative with respect to the cathode. Thus nothing happens and the output signal on conductor 103 continues at a negative level, indicating binary zero. If however the input on conductor 100 is a large negative signal indicative of binary one, then the diode 105 conducts and the negative signal is passed to the control grid of pentode 108 where it is first amplified in amplifier stage 1. It is further amplified in the second and third amplifier stages in pentodes 110 and 112 respectively, if a positive Sample on Read signal is present on input conductor 101. The positive output of amplifier stage 3 is applied to a cathode follower 114 which in turn supplies a positive signal output indicative of binary one.

Various types of suitable driver circuits may be designed for the read and write drivers shown in block form in Fig. 1. One illustrative design of a driver circuit which may be employed is shown in detail in Fig. 3. It is desirable to have the driver circuit provide a pulse of the proper width having a steep leading and trailing edge, sometimes referred to as the rise and fall times. The write driver 120 functions to yield a pulse of proper width and shape on an output conductor 121 in response to an input pulse on either conductor 122 or 123.

Figure 3:
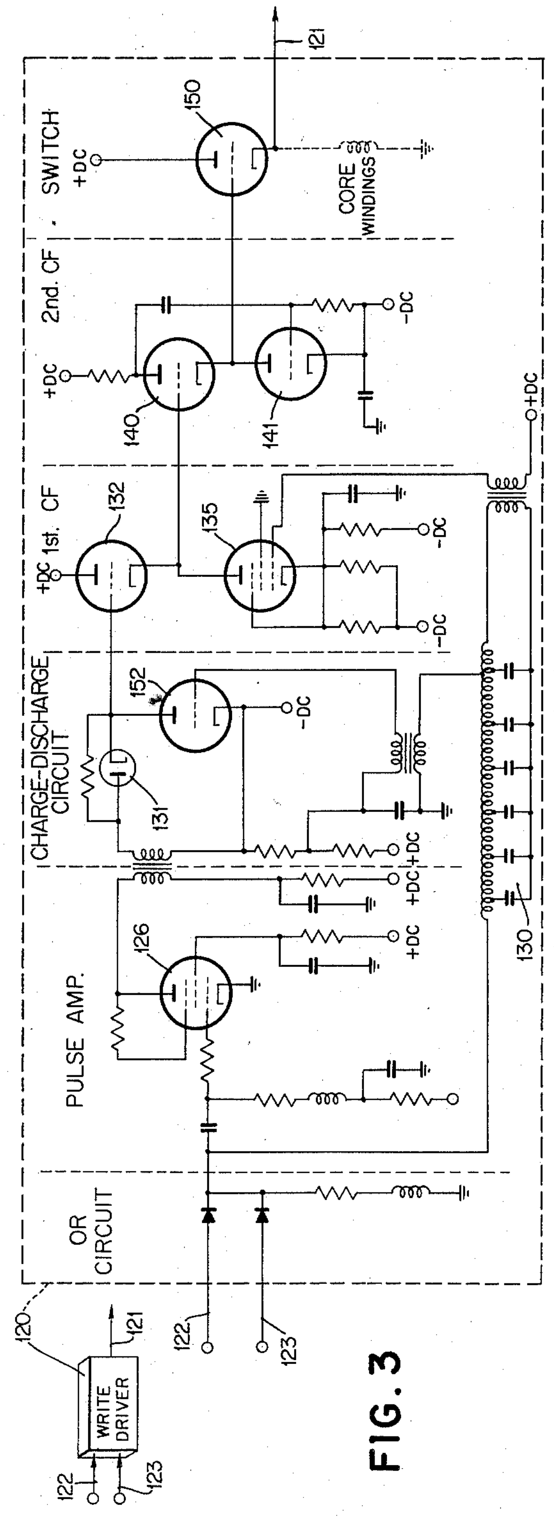
Fig. 3 is a wiring schematic of the write driver shown in block form in Fig. 1.

In the illustrative design of Fig. 3 the proper pulse width is secured by using a delay line 130 to terminate the output pulse a predetermined time after it is initiated by the input pulse. In order to provide initiation and termination of the output pulse with proper leading and trailing edges, six stages of control are employed as labelled. The first stage is an OR circuit supplied by input conductor 122 or 123, one of which is energized by an associated sense amplifier in Fig. 1 and the other by a device supplying new word signals. In the event the driver circuit 120 is for a read driver in Fig. 1, one of these inputs is not utilized.

The second stage is a pulse amplifier which simplifies the input pulse in a pentode 126 and transformer couples the output to the third stage labelled Charge-Discharge Circuit. A diode 131 in this stage initially conducts and charges the capacity of the grid circuit of a vacuum tube 132 in the fourth stage labelled First Cathode Follower (1st CF). A vacuum tube 135 serves as the cathode impedance of cathode follower tube 132. The output of the first cathode follower stage is supplied to the input of the fifth stage labelled Second Cathode follower (2nd CF). Included as the cathode impedance of a triode 140 of this stage is a triode 141 which is controlled by the anode voltage of the cathode follower triode 140. As the input signal to the grid of the triode 140 rises, the anode potential drops and causes the grid potential of the triode 141 to drop, creating a higher cathode impedance for the triode 140. Accordingly, the output signal to the grid of a switch tube 150 in the sixth stage rises rapidly, driving the switch tube 150 into conduction and giving a steep rise to the leading edge of the output current pulse. The output current of the sixth stage is supplied via the conductor 121 to the core winding load, shown in dotted form. As soon as an input pulse traverses the delay line, indicating the output current pulse should be terminated, a pulse is transformer coupled from the delay line to the pentode 135 of the first cathode follower stage, causing conduction in pentode 135 and rapidly reducing the cathode resistance of the first cathode follower. This in turn causes the grid voltage of triode 140 in the second cathode follower to decrease rapidly as its anode voltage rises which rise is coupled to the grid of the triode 141, causing conduction and quick reduction of the cathode resistance of the second cathode follower. Consequently, the voltage on the grid of switch triode 150 is lowered very quickly, causing non-conduction, and the output current pulse is terminated with a very steep trailing edge. Slightly before the pulse from the delay line 130 causes the above sequence of events, a pulse is coupled from the delay line 130 to the grid of triode 152 which causes conduction therein and discharges electrical energy stored in the capacity of the input circuit of this triode. This causes a reduction of the output voltage of the first cathode follower which further accelerates the sequence of events leading to termination of the output pulse. Thus it is seen that the write driver 120 provides a sharply defined output pulse in response to an input pulse. The read drivers shown in block form in Fig. 1 may be similar in design to the write drivers of Fig. 3. The delay line in the former should be somewhat longer than the latter since the read pulse aids in the writing operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A memory device including two bistable magnetic cores per bit or unit of information, one core being designated a storage core and the other a switch core, first winding means on said storage core responsive to read signals to set said storage core in a given magnetic state, a sense amplifier, second winding means on said storage core coupled to said sense amplifier means, said sense amplifier serving to provide an output signal in response to a change in magnetic state of said storage core, a write driver coupled to the output of said sense amplifier, third winding means on said switch core coupled to said write driver, fourth winding means on said switch core connected to a source of current, said fourth winding means providing a constant magnetomotive force in a given direction to said switch core, fifth winding means on said switch core serially connected with said first winding means, a sixth winding means on said switch core and a seventh winding means on said storage core connected in series.

2. A memory device comprising a plurality of storage registers each having a plurality of digit storage positions, two bistable magnetic cores for each digit storage position having winding means intercoupling the two magnetic cores, one of said magnetic cores for each digit position being designated a memory core and the other a switch core, means to apply a read signal to the switch cores and the memory cores of a selected storage register, means to apply a constant biasing signal to all switch cores of said memory device tending to hold said switch cores in the reset condition, said read signal serving to reset the memory cores of such register but apply a magnetomotive force to each biased switch core in the register to oppose its reset condition, sensing means responsive to a change in magnetic state of said memory cores during read out for supplying output signals representative of information, means for applying any output signal from each sensing means of each digit position to the corresponding digit position switch cores of all registers, any output signal tending to set the associated switch cores, whereby said output signal and a read signal in combination on a switch core overcome the effect of the constant biasing signal and set the switch core and the resetting of the switch core by the constant biasing signal after termination of the read signal and information signal causes setting of the associated memory core by the winding means intercoupling the memory and switch cores.

3. A memory device comprising a plurality of storage registers each of which comprises a plurality of digit storage positions, a bistable storage core and a bistable switch core for each digit and a transfer loop coupling said two cores, means for applying a constant first magnetomotive force to said switch cores so as to maintain them in their reset states, read means for applying a second magnetomotive force simultaneously to said storage cores and to said switch cores so as to tend to switch each of said switch cores against its constant magnetomotive force and to fully switch said storage cores if the latter are each in a predetermined stable state, means for producing an output pulse indicative of such switching of said storage cores, further means for employing said output pulse to apply a third magnetomotive force to said switch cores which is additive to the second magnetomotive force being applied to said switch cores whereby the sum of the two applied second and third magnetomotive forces will switch said switch cores, said switch cores, upon being returned to their respective reset conditions by said constant first magnetomotive force at the termination of said additive magnetomotive forces, will apply a signal pulse through its transfer loop to return its corresponding storage core to its predetermined stable state.

4. A storage device comprising a plurality of storage registers wherein each register comprises a plurality of bistable storage cores and bistable switch cores, a transfer loop coupling each storage core and its corresponding switch core, means for applying a constant first magnetomotive force to said switch cores so as to maintain the latter in a reset condition, output circuits for said storage cores, read means associated with said storage cores and with said switch cores and adapted to provide a second magnetomotive force capable of switching each of said storage cores from a first state to its second state so as to produce an output signal in its associated output circuit but in opposition to the constant first magnetomotive force being applied to said switch cores, write means associated with each switch core and adapted to provide a third magnetomotive force in opposition to but incapable of overcoming said constant first magnetomotive force, means for applying said output circuits to said write means whereby the switch cores are switched in opposition to said constant first magnetomotive force, said switch cores returning to their respective reset conditions upon termination of said read and write means, such return of a switch core producing a signal pulse in said transfer loop so as to drive its associated storage core back to its first state.

5. The storage device of claim 4 wherein means are provided for preventing the output circuits from being applied to said write means, permitting the reading of new bits of information into said storage register.

References Cited in the file of this patent

UNITED STATES PATENTS

| | | |
|---|---|---|
| 2,691,155 | Rosenberg | Oct. 5, 1954 |
| 2,696,600 | Serrell | Dec. 7, 1954 |
| 2,708,722 | An Wang | May 17, 1955 |
| 2,734,184 | Rajchman | Feb. 7, 1956 |
| 2,805,409 | Mader | Sept. 3, 1957 |